United States Patent [19]

McKee

[11] 4,365,129
[45] Dec. 21, 1982

[54] MODULAR SECTION INSULATOR SWITCH

[75] Inventor: Kimball K. McKee, Covington, Ky.

[73] Assignee: The Elreco Corporation, Cincinnati, Ohio

[21] Appl. No.: 214,117

[22] Filed: Dec. 8, 1980

[51] Int. Cl.³ .......................................... H01H 21/54
[52] U.S. Cl. ..................... 200/162; 200/15; 200/48 KB
[58] Field of Search ..................... 200/162, 15, 48 KB

[56] References Cited

U.S. PATENT DOCUMENTS

| | | | |
|---|---|---|---|
| 434,152 | 8/1890 | Lange | 200/162 |
| 605,067 | 6/1898 | Badeau | 200/162 |
| 1,549,363 | 8/1925 | Johnston | 191/42 |
| 1,580,302 | 4/1926 | Johnston | 191/42 |
| 1,625,366 | 4/1927 | Johnston | 191/42 |
| 1,629,368 | 5/1927 | Tice | 191/42 |
| 1,658,266 | 2/1928 | Tice | 191/42 |
| 1,695,007 | 12/1928 | Cawood | 191/42 |
| 1,729,656 | 10/1929 | Cawood | 191/42 |
| 1,765,836 | 6/1930 | Johnston et al. | 191/42 |
| 1,932,725 | 10/1933 | Cawood | 191/42 |
| 1,962,259 | 6/1934 | Ritchie et al. | 191/42 |
| 2,070,883 | 2/1937 | Cawood et al. | 191/42 |
| 2,845,512 | 7/1958 | Burt et al. | 200/162 |

OTHER PUBLICATIONS

Trade Literature Entitled "Dukane Introduces the Heavy Duty Section Switch for Mining Operations", published by Dukane Mine Supply Co., Pittsburgh, PA 15209.

Blueprints Entitled "#225-SUR Overhead Line Switch" & "#200-FR Overhead Line Switch," published by Mosebach Mfg. Co., Pittsburgh, PA 15203.

Trade Literature on O-B Section Insulator Switches & On O-B Feeder Switches, pp. 108, 108.1, 108.1.1, 108.1.2, 108.2, 108.2.1, 108.3, 108.3.1, 108.3.2 & 109.1, Published by Ohio Brass Co., Mansfield, OH.

Primary Examiner—Willis Little
Attorney, Agent, or Firm—Wood, Herron & Evans

[57] ABSTRACT

A modular section insulator switch having a unique base on which two feeder cable assemblies and at least two trolley line assemblies may be provided in combination with a switch assembly. In use, different sized feeder cable assemblies and switch assemblies may be interchanged quickly while the switch is in-line to accommodate higher amperage feeder cables because of the unique base.

12 Claims, 6 Drawing Figures

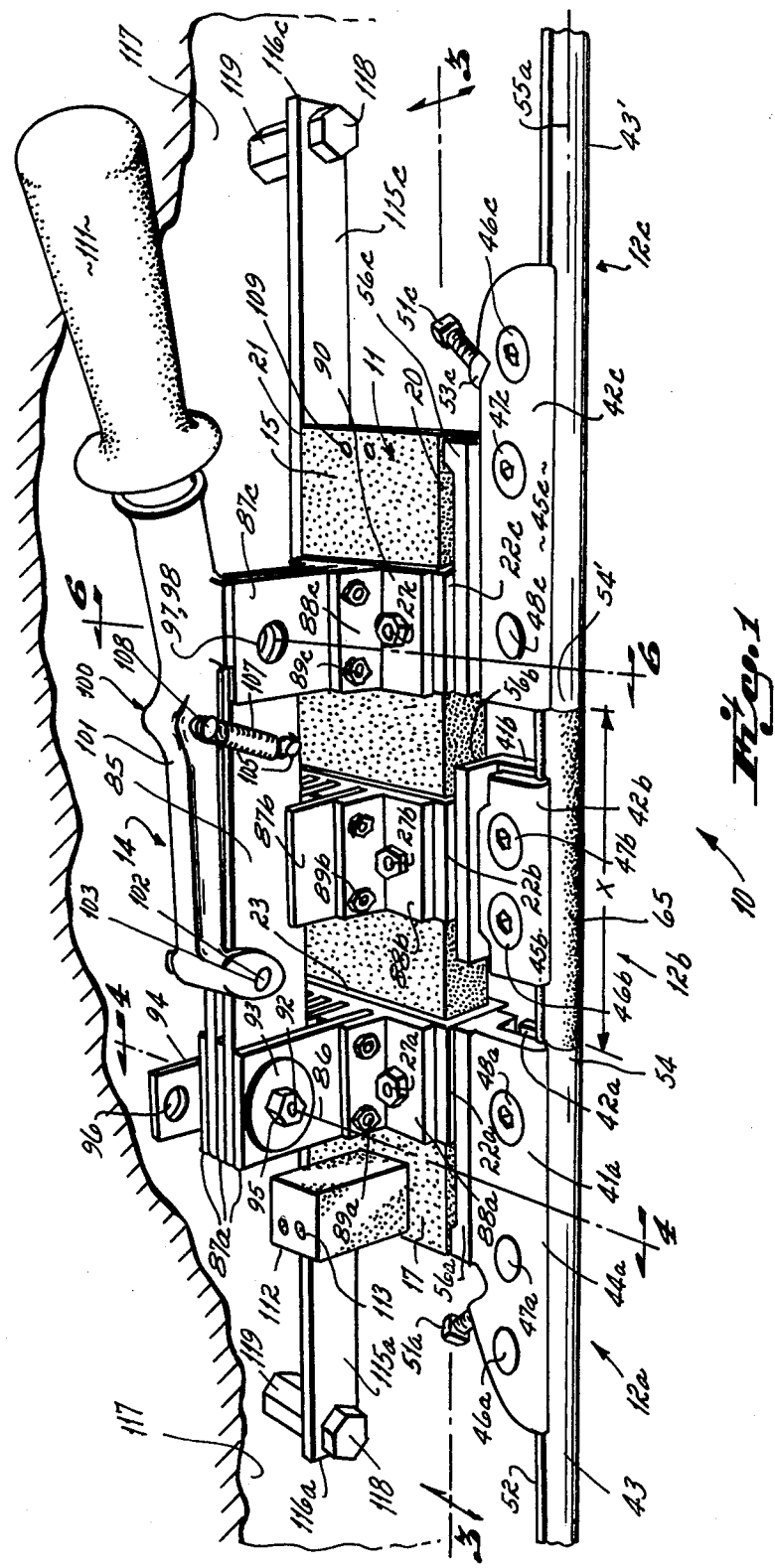

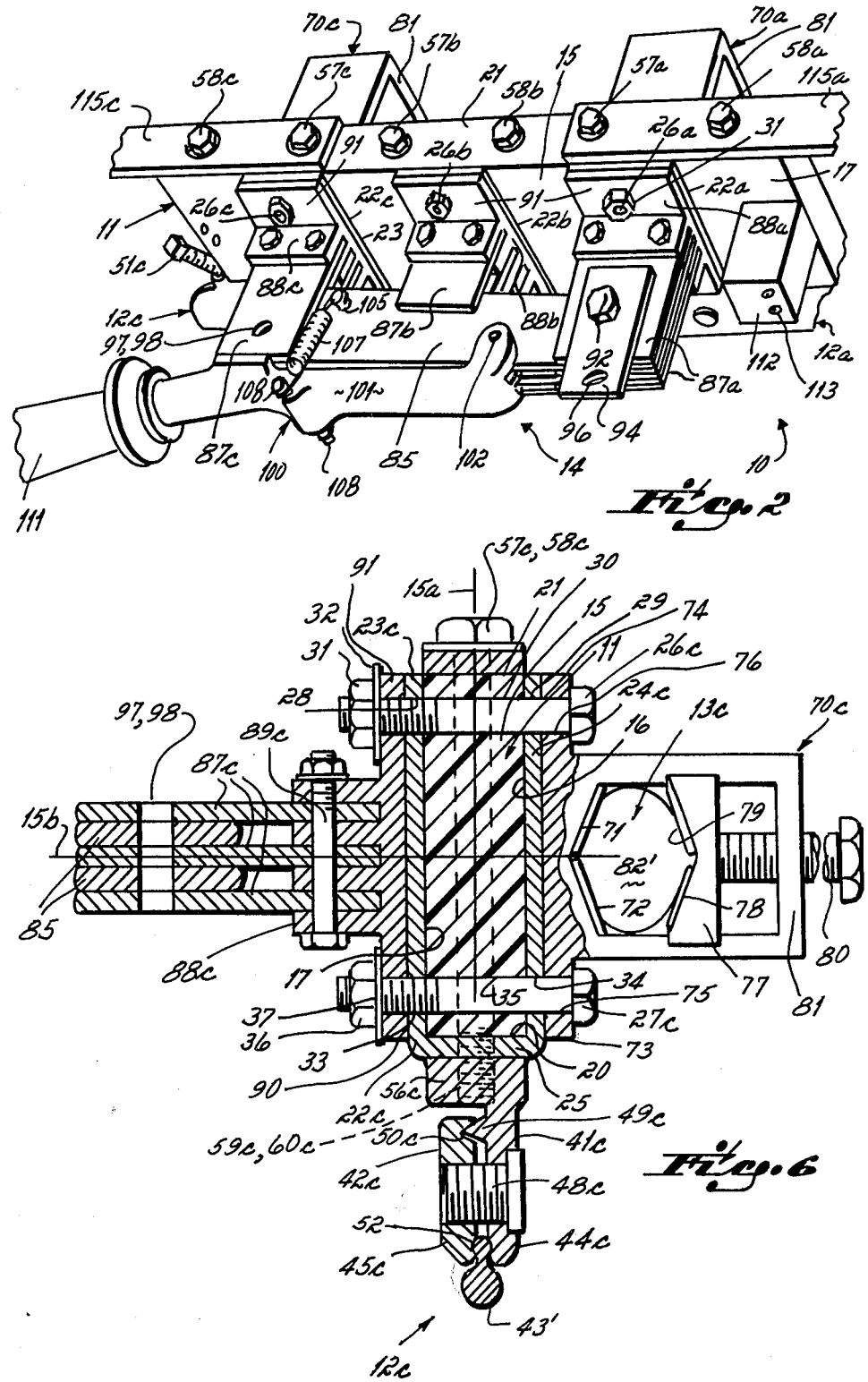

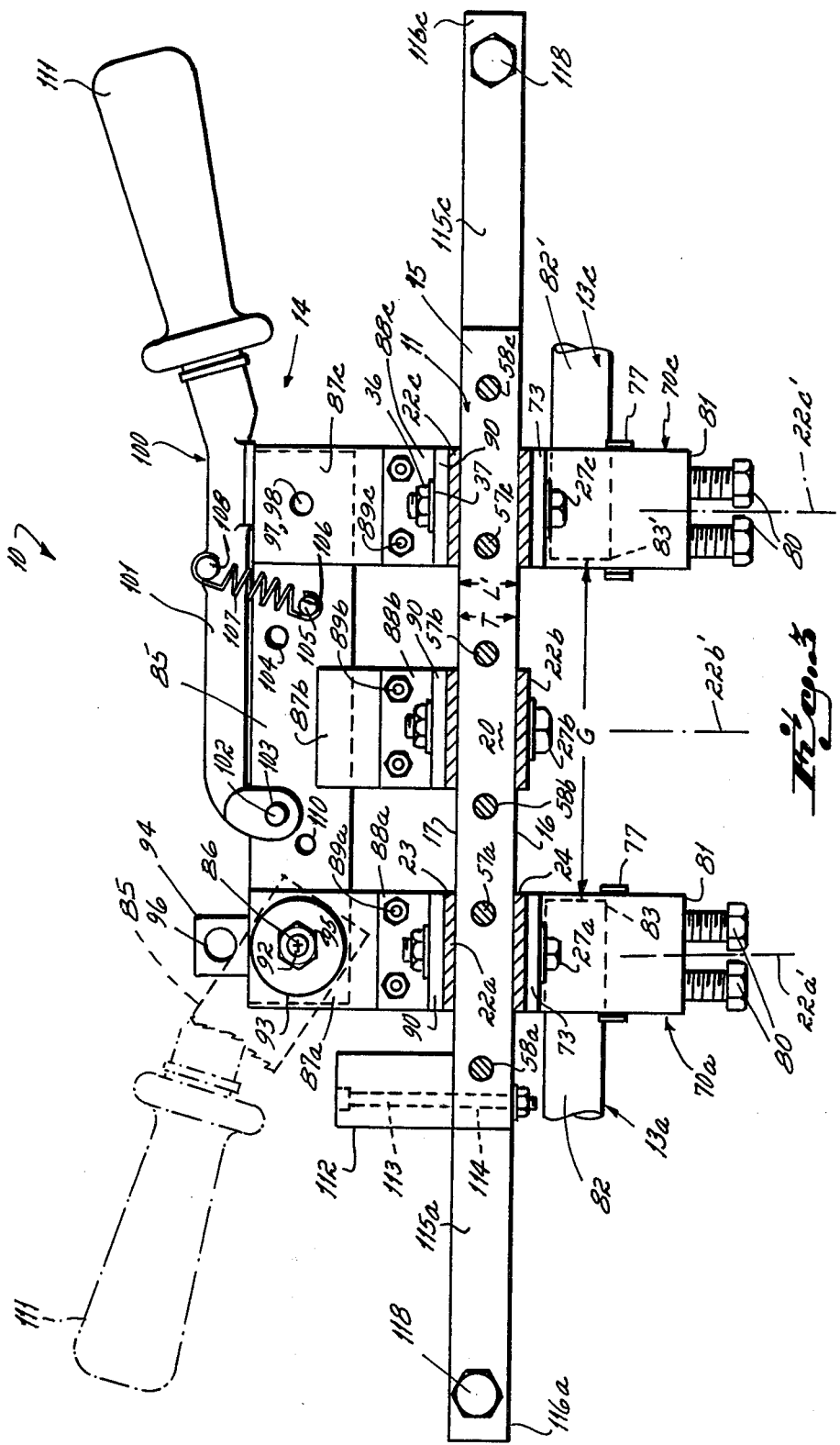

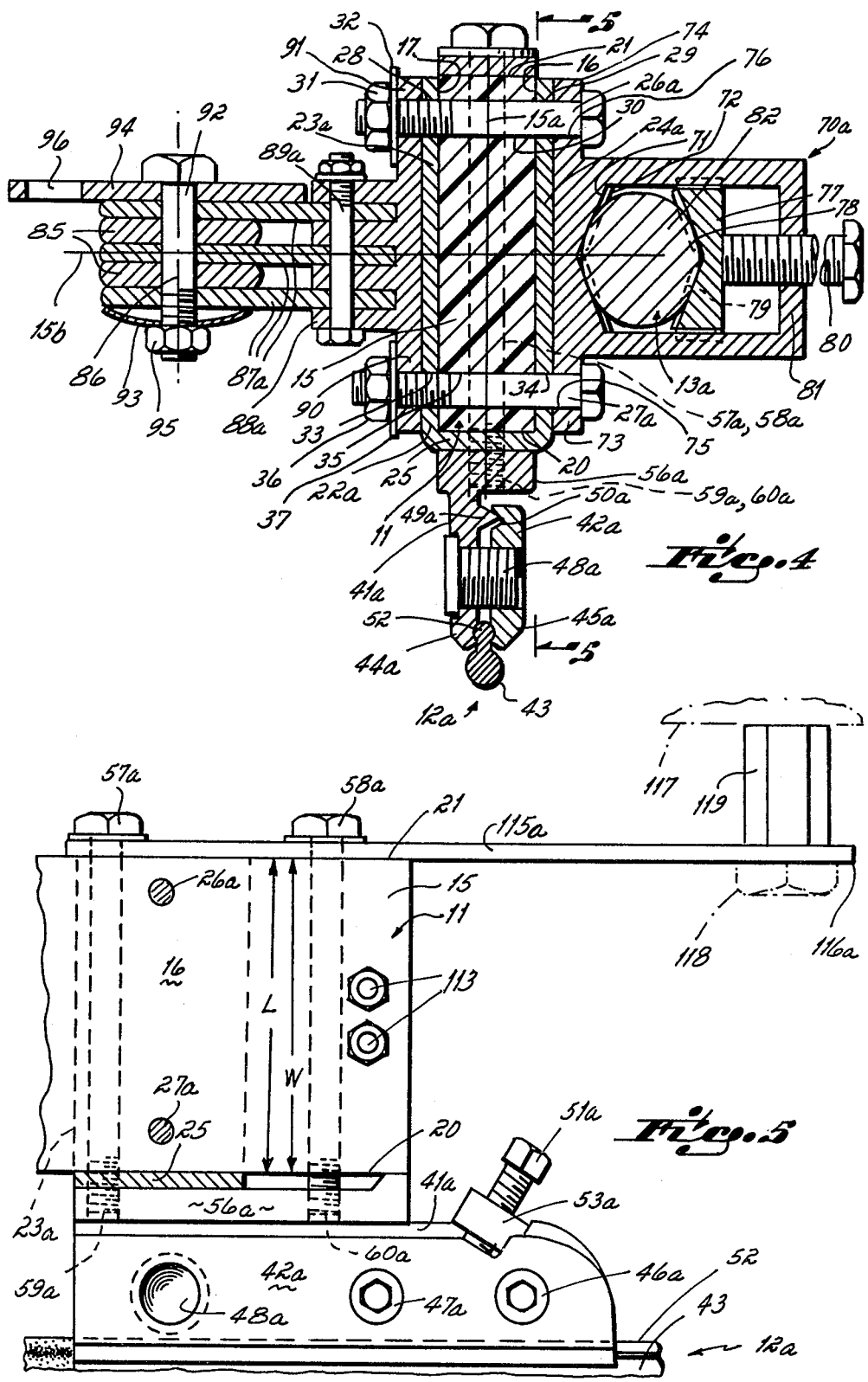

MODULAR SECTION INSULATOR SWITCH

This invention relates to switches. More particularly, this invention relates to section insulator switches particularly adapted for use with trolley lines.

Section insulator switches are well known to the prior art. Such switches are used in mill and mine haulage systems which utilize electrically driven vehicles. Electrically driven vehicles are commonly used inside mills and inside mines for the reason that internal combustion engines are not desired from a safety standpoint. In such mill and mine haulage systems, the electrically powered vehicle is interconnected with a trolley line by a trolley mounted on the vehicle, the trolley sliding along the trolley line as the vehicle moves from place to place within the system. Typically, the system is a DC electric system where the trolley wire is the hot wire of the DC circuit, and the track on which the powered vehicle run is the cold return of the DC circuit.

These mill and mine haulage systems are normally very heavy duty systems which make use of very heavy duty electrically driven vehicles. And the trolley wire itself must remain of constant cross-section configuration and dimensions throughout the system because of the trolleys connected to the vehicles which slide along that wire as the vehicles move from place to place. However, in a DC electric haulage system there is significant amperage drop over prolonged or extended lengths of trolley wire. Therefore, the further the electrically powered vehicle removes itself from the electric power source, the less amperage is available to the vehicle's electric drive motor. This situation generally requires that a feeder cable run parallel to, but spaced from, the trolley wire throughout its length in extensive mill and mine haulage systems. This feeder cable is of significantly higher amperage capacity than the trolley wire, and the feeder cable is connected at spaced locations along its length to the trolley wire so as to maintain a high amperage value throughout the entire trolley wire length.

In such DC mill and mine haulage systems, it is known to the art, and is indeed required from a safety standpoint, to interconnect a series of section insulator switches at spaced locations along the length of the trolley wire in order to cut out electrically the entire system beyond that switch when safety or use requires that same be accomplished. Such section insulator switches, as known to the prior art, and when a feeder cable is used in the system, incorporate two feeder cable assemblies, at least two trolley line assemblies, and a switch assembly, all mounted on a base. Such switches, of course, innerconnect the feeder cable with the trolley wire, and provide a cut out switch for cutting out the downstream trolley wire and the downstream feeder cable, all in the same switch structure.

But the section insulator switches known to the prior art, as far as I am aware, have one major disadvantage that makes their use less than totally efficient in a continuously changing or growing mill or mine haulage system which utilizes DC electrically driven vehicles. Generally speaking, in mill and mine haulage systems the system itself is being continuously expanded or changed as time goes by. In other words, a system may be changed by adding or subtracting loops or branches to the system. Further, the system may be changed by increasing the system's length as the closed system loop expands to meet the requirement of the mill or mine. Periodically, therefore, and as the system increases in length, larger and larger feeder cable is required in order to distribute adequately the DC power requirements over the entire system. When larger or higher amperage capacity feeder cable is required, a section insulator switch designed for a given amperage capacity may no longer be sufficiently sized to serve the higher amperage capacity feeder cable, and this requires that a new section insulator switch be installed in the system to replace the first or original section insulator switch. This approach is, of course, uneconomic from the standpoint of the owner of the mill or mine. The increased amperage capacity is required for the switch's feeder cable assembly, as well as for the switch's switch assembly, when the amperage capacity of the feeder cable is increased out of range of those assemblies of the original section insulator switch. The trolley line assemblies need not be replaced, however, because the trolley line cross-sectional area and size remains the same throughout the entire system. The trolley wire, as previously mentioned, cannot be enlarged or changed throughout the system because of a constant size is required to fit the trolley shoe or collector carried by the vehicle as it moves throughout the system. A further correlary of this same problem arises when the original mill or mine haulage system is of a length that no feeder cable is required. In this situation the trolley wire itself is of sufficient amperage capacity to carry DC power from the power source to the vehicle throughout the system's length, and the section insulator switch usually does not include feeder cable assemblies. But when the system is extended, by branching or otherwise, so that the amperage drop from power source to vehicle over the trolley wire length of the system is no longer acceptable, then feeder cable must be strung throughout the system parallel to the trolley line wire. Again in this aspect of the problem, the original section insulator switches (without feeder cable assemblies) must be removed from the trolley wire throughout the system, and new section insulator switches provided with feeder cable assemblies. Such also, of course, is quite an expensive undertaking from a new parts standpoint, as well as from a labor standpoint, to the owner of the mill or mine haulage system.

Accordingly, is has been one objective of this invention to provide a modular section insulator switch, the switch having an unique base which is structured so as to accommodate either one or both of two or more trolley line assemblies and two feeder cable assemblies, and which is also structured to incorporate in combination if desired a switch assembly, thereby providing a modular section insulator switch that may be provided with one or more trolley line assemblies, feeder cable assemblies and switch assembly as desired and as required depending on its end use function in a mill or mine haulage system.

It has been another objective of this invention to provide a modular section insulator switch for trolley wire, the switch having a unique base structured so that the feeder cable assemblies and switch assembly can be added or subtracted or new sizes installed as desired while the insulator switch remains connected to the trolley wire, thereby providing a modular section insulator switch that may have its amperage capacity sized up or down as desired and as required depending on its connected position in the mill or mine haulage system with which it is used.

A further problem associated with trolley line section insulator switches of the prior art is that significant and substantial arcing occurs between left and right hand trolley runner assemblies as the vehicle's trolley traverses the gap between those two sections. In certain section insulator switches for trolley lines, there is a center or dead trolley runner assembly interposed between the live left and right hand end trolley runner assemblies in an effort to minimize the arcing problem. But the arcing problem still exists.

Accordingly, it has been a further objective of this invention to provide an improved trolley wire section insulator switch having three trolley runner assemblies for restraining the trolley wire in connected relation with the switch, the center one of the sections being provided with a non-conductive spacer element which is sized and configured in cross-section identical to the trolley wire, and which is connected to that center section coaxially with the trolley wire, thereby providing a center dead section for the switch but minimum chance for arcing between the switch and the vehicle's trolley since that center dead space section provides a structural support for the trolley that is not electrically conductive or electrically alive.

Other objectives and advantages of this invention will be more apparent from the following detailed description taken in conjunction with the drawings in which:

FIG. 1 is a perspective view of one side of a section insulator switch in accord with the principles of this invention;

FIG. 2 is a perspective view of the other side of the section insulator switch shown in FIG. 1;

FIG. 3 is a bottom view of the section insulator switch taken from the line 3—3 of FIG. 1;

FIG. 4 is a cross-sectional view taken along line 4—4 of FIG. 1;

FIG. 5 is a side view taken along line 5—5 of FIG. 4; and

FIG. 6 is a cross-sectional view taken on line 6—6 of FIG. 1.

The novel section insulator switch 10 of this invention, as shown in FIGS. 1 and 2, is comprised of a unique base 11, three separate trolley line assemblies 12a–12c, two separate feeder cable assemblies 13a, 13c, and a switch assembly 14. The trolley line assemblies 12, feeder line assemblies 13, and switch assembly 14 are all mountable on the base 11 in any combination because of the nature and unique structure of that base 11, all as described in greater detail below.

The switch's base 11, as particularly shown in FIGS. 1 and 4, includes an elongated solid body or board 15 which is fabricated of an electrically non-conductive material, e.g., fiber reinforced plastic. This body 15 is of generally rectangular crosssectional configuration, and defines a phantom longitudinal plane 15a and a phantom transverse plane 15b normal to the longitudinal plane. The body's wide sides 16, 17 are parallel to longitudinal plane 15a, and the body's narrow sides 20, 21 are parallel to transverse plane 15b. Three yokes 22a–22c of generally U-shaped crosssectional configuration are mounted on the body 15, (see yoke 22a, FIG. 4). Each of the yokes 22 is positioned on the body so that the plane 22a'–22c' of each yoke is generally normal or perpendicular to the body's longitudinal plane 15a. Further, each of the yokes 22 is of a generally U-shaped configuration with the yoke's legs 23, 24 being of a length L substantially equal to the width W of the body 15, and the yoke's base 25 being of a length L' substantially equal to the thickness T of the body 15. In this configuration, therefore, each U-shaped yoke's legs 23, 24 overlie the wide faces 16, 17 of the switch's body 15, and each U-shaped yoke's base 25 overlies one narrow face 20 of the switch's body. The yokes 22a–22c are positioned on the switch's body 15 so that all the yoke's bases 25 abut the same narrow face 20 of the body. Each yoke 22 is held in connected relation with the body by a pair of through bolts 26, 27. One bolt 26 of each through bolt pair passes through aligned bores 28, 29 in the yoke's legs 23, 24 adjacent the free ends thereof and through an aligned bore 30 in the switch's body 15, the bolt being held in innerconnected relation by nut 31 and washer 32. The other bolt 27 of each through bolt pair passes through aligned bores 33, 34 in the yoke's legs 23, 24 adjacent the yoke's base 25 and through an aligned bore 35 in the switch's body 15, the bolt being held in position by nut 36 and washer 37. These three pairs 26a, 27a–26c, 27c of through bolts, in addition to mounting the yokes 22a–22c to the switch's body 15, also function to mount the trolley line assemblies 12a–12c, the feeder cable assemblies 13a, 13b, and the switch assembly 14 to that body as is discussed in detail below. The U-shaped yokes 22a–22c are sized so as to accommodate the maximum amperage load expected for which the section insulator switch is adapted for use.

The trolley line assemblies 12a–12c include a left end trolley assembly 12a, a center trolley assembly 12b and a right end trolley assembly 12c as shown in FIGS. 1 and 2. These trolley assemblies 12a–12c are innerconnected with the switch's base 11 as shown in FIG. 4. The left end trolley assembly 12a is comprised of two runners 41a, 42a, i.e., a split trolley runner, which allows it to accommodate various sizes of trolley wire 43. The left end trolley assembly 12a includes a fixed left end runner 41a which is directly mounted to the switch's base 11, and a movable left end runner 42a which is connected only to the fixed runner, both runners being fabricated of electrically conductive material. The tip or outer edge of the fixed 41a and movable 42a trolley runners are configured in cross-section, as shown in FIG. 4, to provide jaws 44a, 45a, respectively, adapted to grip head section 52 of the trolley wire 43. The movable left end runner 42a is connected with the fixed left end runner 41a by a series of three draw down bolts 46a–48a which are spaced along that runner's length from one end to the other. The function of the three draw down bolts 46a–48a is to permit opening and closing of the runner's jaws 44a, 45a relative one to the other for the purpose of gripping or releasing the trolley wire's head section 52 therebetween. Clamping lip 49a provided on the fixed runner 42a cooperates with clamping groove 50a provided on the movable runner 43a to equalize clamping pressures throughout the left end trolley runner 41a, 42a when the movable runner 42a is drawn down tight toward the fixed runner 41a as the trolley wire's head section 52 is gripped therebetween. A straightening bolt 51a is threadedly received in collar 53a formed integral with the fixed runner 41a. This straightening bolt 51a is adjustable in the plane of the trolley wire 43 when the trolley wire is connected with the trolley runner 41a, 42a, but is angled relative thereto. The function of the straightening bolt 51a is simply to maintain axial linearity of the trolley wire 43 along that trolley runner 41a, 42a since the trolley wire would normally tend to curve or curl at its free end 54 as the trolley wire tightened down between the trolley runner's jaws 44a, 45a. The left end trolley runner 41a, 42a is connected to the switch's base 11 and, more particularly, to the base's left hand yoke 22a, so that the phantom longitudinal plane 55a of the runner 41a, 42a is coplanar with the phantom longitudinal plane 15a of the body 15, i.e., so that the runner 41a, 42a extends outwardly from narrow face 20 of the base's body 15. This connection is achieved through use of foot plate 56a formed integral with the fixed runner 41a, this foot plate is sized so as to fit flush against the yoke's base 25a, thereby establishing electrical contact between the runner 41a, 42a and yoke 22a, and thereby also orienting the runner 41a, 42a generally in a plane 55a coplanar with the plane 15a of the base's body 15. The left end trolley runner 41a, 42a is held in connected relation with the switch's base 11 and, more particularly, in electrical connection with the left hand yoke 22a, by a pair of through bolts 57a, 58a that extend through the narrow face walls 20, 21 of the base's body 15, i.e., in the phantom longitudinal plane 15a, and into threaded or tapped relation as at 59a, 60a, with the left end runner's foot 56a. The left end trolley runner's connector bolts 57a, 58a, therefore, extend generally normal to the base's phantom transverse plane 15b and abut against narrow width face 21 of the body 15 which is opposite to the narrow width face 20 against which the yokes' bases 25a-25c abut and against which the left end trolley runner 41a, 42a is mounted. Note, therefore, that the left hand trolley runner 41a, 42a can be easily removed from the base 11 simply by removing the two through bolts 57a, 58a that connect it to the left hand yoke's base 25a, those through bolts being easily accessible from the back edge 21 of the base.

The right hand trolley runner 41c, 42c of the section insulator switch 10 is of identical structure to the left hand trolley runner 41a, 42a except that it is reversed as installed on the switch's base 11. In other words, the right hand trolley runner 41c, 42c itself is of identical structure to the left hand trolley runner 41a, 42a. And the right hand trolley runner 41c, 42c is connected to the right hand yoke 22c in identical fashion and by identical structure as the left hand trolley runner 41a, 42a is connected to the left hand yoke 22a except that it is merely reversed when positioned at the right hand end of the switch's base 11 as opposed to the position of the left hand trolley runner at the left hand end of the switch's base as installed. Therefore, and in connection with right hand 41c, 42c and left hand 41a, 42a trolley runners, identical parts have identical numbers but the right hand trolley runner's parts are number with a "c" behind the reference numeral and the left hand trolley runner's parts are numbered with an "a" behind the reference numeral.

The center trolley runner 22b is also mounted to the switch's base 11, contains the same basic parts, and is of a somewhat similar but not identical configuration, to the left 41a, 42a and right 41c, 42c hand trolley runners. With the center trolley runner 41b, 42b, the same basic parts have the same reference numerals but with a "b" behind the numeral as is used with the left 12a and right 12c end runner assemblies. The center trolley runner 41b, 42b also includes a fixed runner 41b immobily connected to the center yoke 22b, and a movable runner 42b connected to the fixed runner by adjustment screws 46b, 47b. The center trolley runner's movable runner 42b and fixed runner 41b are provided with jaws 44b, 45b as were the left 12a and right 12c end trolley runner assemblies, and are provided with a lip 49b and groove 50b structure for equalizing pressure when the trolley wire's head 52 is trapped in those jaws also as was the case with the left hand and right end trolley runners. Further, the center trolley runner's movable runner 42b is adjustable for receiving and pressure holding the trolley wire's head section 52 therebetween through use of adjustment screws 46b, 47b also as was the case with the left 12a and right 12c end trolley runner assemblies. The center runner 41b, 42b is retained in fixed or mounted relation with the switch's base 11 also by a pair of through bolts 57b, 58b. These through bolts 57b, 58b are aligned in the base's longitudinal plane 15a, and pass through the base's body 15 from one narrow face edge 21 to the other 20, the bolts being received in threaded relation as at 59b, 60a with foot 56b of the center trolley runner's fixed runner 41b. In this regard, the center trolley runner's base 56b sits in electrical contact against the center yoke's base 25b when the center trolley runner 41b, 42b is connected to the switch's base 11. But the wire section 65 received between the jaws 44b, 45b of the center trolley runner 41b, 42b is not electrically conductive trolley wire. The trolley wire 43, 43' held by the left 12a and right 12c hand trolley runner assemblies is, of course, highly electrically conductive, e.g., copper wire. But the wire section 65 received by the center trolley runner 41b, 42b is of an electrically non-conductive material. Importantly relative to one aspect of this invention, however, this electrically non-conductive center wire section 65 is configured in cross-section identical to the cross-section of the trolley wire 43, 43' itself, and is preferably sized in length X so as to fit exactly between the cut off ends 54, 54' of the trolley wire 43, 43' retained by the left 12a end and right 12b end trolley runners, see FIGS. 1 & 2. When such is the case, a dead section 65 or dead length of trolley wire configured material is interposed between the live trolley wires 43, 43', thereby providing no air gap to generate arcing when a vehicle's trolley (not shown) passes from contact with the left hand trolley wire 43 across the gap X into contact with the right hand trolley wire 43'. This, of course, is highly desirable from a use standpoint in the field as it minimizes arcing between the vehicle's trolley and the trolley wire as the vehicle's trolley passes the switch 10.

There are two feeder cable assemblies 13a, 13c connected to the switch's base 11 on the same wide face 19 of the base's body 15. These two feeder cable assemblies 13a, 13c are electrically connected to the left hand 22a and right hand 22c yokes, respectively, each feeder cable assembly being connected to the base 11 by the same pair of through bolts 26a, 27a and 26c, 27c that connects its respective yoke to the base's body 15. Each feeder cable assembly 13a, 13c, as shown in FIGS. 4 and 6, includes an electrically conductive closed loop bracket 70 having a generally V-shaped floor 71 provided with cable gripper ribs 72. Feet 73, 74 extend outwardly from opposite sides of the bracket's floor 71, the feet being provided with bores 75, 76 to receive the through bolts 26, 27 and, thereby, connect the feeder cable assembly to the switch's base 11. In this regard, and as shown in FIG. 3, the width of the feeder cable bracket 70 is substantially equal to the width of the yoke's leg 24 on which it is mounted, thereby establishing good electrical contact between the bracket and the yoke 22 on which it is mounted. Each feeder cable assembly also includes a feeder lug 77 provided with a generally V-shaped surface 78 that has gripper ribs 79 formed thereon. Hold down bolts 80 threadedly received in the bracket's end wall 81 cooperate with the feeder lug 77 to hold down a feeder cable 82 between the lug and the bracket's floor 71 during use. As previously mentioned, left hand feeder cable assembly 13a is mounted on the leg 24 of the left hand yoke 22a and right hand feeder line assembly 13c is mounted on the analagous leg 24 of the right hand yoke 22c. With feeder cable 82, 82' gripped by each of the feeder cable assemblies, a large gap G is provided between the cut off ends 83, 83' of that feeder cable. But the left 13a and right 13c hand feeder cable assemblies are each electrically connected to the left hand 12a and right hand 12c trolley runner assemblies, respectively, through the left 22a and right 22c hand yokes, respectively, to which the trolley line and feeder cable assemblies are mounted. When it is desired to remove the feeder cable assemblies 13a, 13c, or to interchange one size for another size feeder cable assembly, with the switch's base 11, it is only necessary to remove the two through bolts 26, 27 and make the removal or the exchange. Such can be easily accomplished without removing the section insulator switch 10 from connected relation with the trolley line 43, 43'.

The switch assembly 14 is particularly illustrated in FIGS. 1, 3 and 4. The switch assembly 14 includes a double switch blade 85 pivotally connected on axis 86 to a left hand jaw comprised of left hand blade contact plates 87a immobily mounted to left hand blade plate mounting bracket 88a. The left hand blade contact plates 87a, which define blade jaws for the double switch blade 85, are permanently fixed to the left hand blade plate mounting bracket 88a by bolts 89a. The left hand blade plate mounting bracket 89a is immobily fixed to one leg 23a of the left hand yoke 22a by the same pair of through bolts 26a, 27a that connect that yoke to the switch's base 11. The width of the left hand blade mounting bracket's feet 90a, 91a is substantially the same as the width of the left hand yoke's leg 23a, thereby providing good electrical contact throughout the entire facial contact area of that bracket 88a with the yoke's leg. The pivot interconnection of the double switch blade 85 with the left hand blade contact plates 87a is provided by a pivot bolt 92, a Belville washer 93 being provided on the outside of one outermost contact plate and a lock out strap 94 being provided on the other side of the other outermost blade contact plate, same all being held in assembly by bolt 92 and nut 95. When the double switch blade 85 is fully opened as shown in dotted lines, a padlock (not shown) or the like may be provided through bore 96 in the lock out strap 94, thereby preventing the switch 10 from being closed when same is not desired.

The double switch blade 85 also cooperates with a right hand jaw comprised of right hand blade contact plates 87c immobily fixed to right hand blade plate mounting bracket 88c by bolts 89c. This right hand blade plate mounting bracket 88c is immobily fixed to the right hand yoke 22c by the same through bolts 26c, 27c that connect that yoke to the switch's base 11. Note particularly that through bores 97 are provided in the right hand blade contact plates 87c which are axially aligned with through bores 98 provided in the double switch blade 85 when the switch is closed as shown in solid lines in FIGS. 1 and 6, this structure being for the purpose described below. Since the left hand 87a, 88a and right hand 87c, 88c jaws are electrically connected with the left 22a and right 22c hand yokes, which in turn are electrically connected with the left 13a and right 13c hand feeder cable assemblies and with left 12a and right 12c hand trolley runners, it is apparent that an electrical circuit between feeder cable sections 82, 82' and trolley wire sections 43, 43' can be closed when the double switch blade 85 is closed as shown in solid lines in the figures. The double switch blade further cooperates with a center jaw comprised of a center blade plate mounting bracket 88b mounted to the center yoke 22b by through bolts 26b, 27b, the center mounting bracket 88b being similarly structured and connected to the switch's body 11 as are the left 88a and right 88c hand blade plate mounting brackets. The center mounting bracket 88b includes blade contact plates 87b of a shorter length than the left 87a and right 87c hand blade contact plates, but same are connected to the center blade plate mounting bracket 88b by bolts 89b in a similar fashion to the mounting of the left and right hand blade contact plates.

The switch assembly's handle 100 is shown for right hand operation in the figures. In this mounted position, the handle's lever arm 101 is pivotally mounted by pivot pin 102 (held in pivot pin bore 103) to the double switch blade 85, this handle pivot pin connection being provided adjacent the left hand jaw 87a, 88a. An alternate handle pivot pin bore 104 through the double switch blade is positioned adjacent the right hand jaw 87c, 88c.

A spring pin 105 (held in spring pin bore 106) is connected to the double switch blade 85 adjacent the right hand jaw 87c, 88c with a tension spring 107 being connected between that spring pin and the handle's lever arm 101 as at 109. An alternate spring pin bore 110 is provided in the double switch blade 85 adjacent the left hand jaw 87a, 88a. When right hand opening or use of the switch assembly 14 is desired, non-conductive handle 111 is moved from the solid line position toward the dotted line position as shown in FIG. 3, the double switch blade 85 remained in friction fit with the right hand blade contact plates 87c until the tension force induced in tension spring 107 overcomes that friction fit, thereby popping open the double switch blade 85 quickly with minimum arcing. Alternatively, if left hand opening or use of the switch assembly 14 is desired, the pivot pin 92 is simply reinstalled in the right plate's pivot pin bore 97, the handle pin 102 reinstalled in the left hand handle pin bore 104, and the spring pin 106 introduced into the alternate spring pin bore 110, while reversing the lever arm 101 and handle 111 to accommodate these changes (see phantom line position of the handle in FIG. 3). An electrically non-conductive blade stop block 112 is mounted on the base's body 15 adjacent the hinge pin 92 of the double switch blade 85. This stop block 112 is held to the body 15 by bolts 113 received in tapped bores 114 within the body. The stop block 112 can be reinstalled on the left hand end of the switch's body 15 (which would be done when the lever arm 101 and handle 111 are removed to left hand operation) through use of tap bores 109 on the left hand end of that body.

Note particularly that the switch's left hand 87a, 88a, and right hand 87c, 88c jaws are retained in electrical contact with the left 22a and right 22c hand yokes by the same through bolt pairs 26, 27 which connect the feeder cable assemblies 13a, 13c to the left 22a and right 22c hand yokes. This permits easy and simple changing of the knife blade switch assembly 14, and of the feeder cable assemblies 13, when such change is desirable, and permits easy and simple installation of any of those components when desired if the component is not originally supplied with the section insulator switch 10. In this regard, the feeder cable assemblies 13 and the knife blade switch assembly 14 are located on opposite sides of the switch's body 15, thereby promoting safety in that an operator's hands on the switch handle 111 are substantially removed from the feeder cable during use of the switch assembly 14.

The section insulator switch 10 also includes left 115a and right 115c hand support arms which extend outwardly from left 116a and right 116c hand ends of the switch's body 15. Each support arm 115a, 115c is mounted to the narrow width face 21 of the body 15 by the same through bolts 57a, 58a and 57c, 58c, respectively, that connect the related trolley runner 41a, 42a and 41c, 42c, (respectively, to the body. In other words, the through bolts 57a, 58a that connect the left hand trolley runner 41z, 42a to the switch's body 15 also connect the left hand support arm 115a to the body, and similarly for the right hand trolley runner 41c, 42c and the right hand support arm 115c. It is by means of these support arms 115 that the section insulator switch 10 of this invention may be attached to, for example, a ceiling 117 structure of a mill or mine in which the switch is used. When so mounted, bolts 118 cooperate with spacer blocks 119 to mount the switch onto the support structure, in this case a ceiling 117 as shown. When so mounted the handle 101 is movable in a plane generally parrallel to the ceiling 116.

The section insulator switch 10 of this invention is a modular switch in the sense that is has multiple uses depending on those of the trolley line assemblies 12, feeder cable assemblies 13, and switch assembly 14 which are present in structural combination with the base 11. For example, the section insulator switch may be used as a feeder cable 82 and trolley wire 43 section switch when all of the trolley line assemblies 12, feeder cable assemblies 13, and switch assembly 14 are in position. In this structural configuration, and as previously discussed, when the feeder cable assemblies 13 and switch assembly 14 are not sized sufficient to carry heavier amperage loads, those assemblies may be easily changed while the switch itself remains attached to the trolley wire 43. This change is easily accomplished by removing the pairs of bolts 26, 27 which mount the left 13a and right 13c hand feeder assemblies and left 88a, 90a and right 88c, 90c switch jaws (along with the double switch blade 85 attached thereto), and substituting therefore new assemblies of higher amperage load characteristics. Such is accomplished in both the left and right hand assemblies merely by removing and reinstalling the two pairs of through bolts 26a, 27a and 26c, 27c which cooperate with the left 22a and right 22c hand yokes of the switch's base 11. A second use configuration is as a trolley wire 43 only section switch. In this second attitude, no feeder cable assembly 13 is attached to the switch's base 11, i.e., only the switch assembly 14 and the trolley line assemblies 12a–12c are connected to the switch's base. Again, such is easily accomplished either by not installing the feeder cable assemblies 13 with the base 11 in the first instance, or by removing those feeder cable assemblies 13 (by use of the through bolts 26, 27) when it is desired to make the section insulator switch useful for trolley wire 43 only. A third use structural configuration for the section insulator switch 10 is as a feeder cable 82 only section switch. In this attitude, the trolley wire assemblies 12a–12c are removed from the switch's base 11, or not installed therewith in the first place. Such removal is easily accomplished simply by removal of the pairs of lateral through bolts 26, 27 which extend through the switch's body 15 from one edge 21 into threaded relation with the left 41a, center 41b and right 41c trolley runners. A fourth use attitude of the switch 10, with three different options, is as a dead block section insulator switch. In this fourth attitude, the switch assembly 14 is removed from the switch's base 11, thereby leaving only at least one of the trolley line assemblies 12 and the feeder cable assemblies 13 connected to the yokes 22. This removal, or non-installation in the first instance, the switch assembly 14 is again easily accomplished through use of transverse through bolts 26, 27. In this fourth use attitude, sectionalization of both feeder cable 82 and trolley wire 43 is accomplished when both the feeder cable assemblies 13 and trolley line assemblies 12 are mounted to the switch's base 11. The switch 10 can also be used only as a trolley line 43 sectionalization switch, or only as a feeder cable 82 sectionalization switch, simply by eliminating the unwanted assemblies from structural combination with the base 11. All of the modular advantages of this section insulator switch 10 are obtained through use of the switch's unique base 11 which is comprised of the electrically non-conductive body 15 in combination with the U-shaped electrically conductive yokes 22, all of which cooperate with the pairs of longitudinal through bolts 57, 58 and lateral through bolts 26, 27 to mount one or more of the switch assembly 14, trolley line assemblies 12 and feeder cable assemblies 13 in operative combination therewith.

Having described in detail the preferred embodiment of my invention, what I desire to claim and protect by Letters Patent is:

1. A trolley wire section insulator switch, said switch comprising
    a base,
    left hand, center and right hand trolley runners connected to said base, said center runner being spaced from both said left and right hand trolley runners, each of said left and right hand trolley runners comprising jaws adapted to receive an electrically conductive trolley wire in mounted relation therewith, and
    an electrically non-conductive trolley wire section mounted in said center trolley runner, said electrically non-conductive wire section serving as a support for a vehicle's trolley to ride against as said vehicle's trolley traverses said switch from said left hand trolley runner to said right hand trolley runner, and said electrically non-conductive trolley wire section being of a length sufficient to substantially span the gap between the respective inner ends of said left and right hand trolley runners, thereby providing an electrically non-conductive support for a vehicle's trolley across said gap for minimizing arcing between said switch and said trolley as said trolley traverses said switch.

2. An insulator switch as set forth in claim 1, said non-conductive trolley wire section being of generally the same cross-sectional configuration and dimensions as the electrically conductive trolley wire to be received in said left and right hand trolley runners.

3. An insulator switch as set forth in claim 1, said switch comprising
    a switch assembly connecting said right hand and left hand trolley runners, said switch assembly being mounted on said base.

4. An insulator switch as set forth in claim 1, said switch comprising
left hand and right hand feeder cable assemblies, said left hand feeder cable assembly being electrically connected to said left hand runner and said right hand feeder cable assembly being electrically connected to said right hand trolley runner.

5. A modular section insulator switch for a trolley wire system, said switch being adaptable for use with a maximum amperage capacity system as well as with a minimum amperage capacity system, said switch comprising
at least one of (a) a switch assembly having left and right hand mounting brackets, (b) left hand and right hand trolley wire assemblies, and (c) left hand and right hand feeder cable assembles, the amperage capacity of at least one of said switch assembly and said feeder cable assemblies being sized relative to the length of said trolley wire system so that change of at least one of said assemblies is required when it is desired to increase or decrease the amperage capacity of said switch,
an electrically non-conductive body that defines a longitudinal phantom plane therethrough and a lateral phantom plane therethrough, said body having opposed side faces generally parallel to said longitudinal plane and opposed end faces generally parallel to said lateral plane, said phantom planes being generally normal one to the other,
left hand and right hand electrically conductive U-shaped yokes received in spaced relation one from the other in seated position on said body, each yoke having first and second side legs, and a base leg, said first side leg being positioned generally flush against one side face of said body, said second side leg being positioned generally flush against the other side face of said body, and both of said U-shaped yokes being sized for use at said maximum amperage capacity,
said switch assembly's left hand bracket being mountable on and demountable from said first leg of said left hand yoke and said switch assembly's right hand bracket being mountable on and demountable from said first leg of said right hand yoke, said left hand feeder cable assembly being mountable on and demountable from said second leg of said left hand yoke and said right hand feeder cable assembly being mountable on and demountable from said second leg of said right hand yoke, and said left hand trolley line assembly being mountable on and demountable from said base leg of said left hand yoke and said right hand trolley line assembly being mountable on and demountable from said base leg of said right hand yoke, and
at least one of
at least one transverse through bolt associated with each of said yokes, said left hand transverse through bolt extending generally parallel to said lateral plane through said body for connecting and disconnecting at least one of said switch assembly's left bracket and said left hand feeder cable assembly to said left hand yoke, and said right hand transverse through bolt extending generally parallel to said lateral plane through said body for connecting and disconnecting at least one of said switch assembly's right bracket and said right hand feeder cable assembly to said right hand yoke, the length of said through bolts being such as to mount both said switch assembly and said feeder cable assemblies to said yokes to permit easy addition or removal of those assemblies on said U-shaped brackets when a change in the amperage capacity of said switch is desired by a user, and
at least one longitudinally through bolt associated with each of said yokes, said left hand longitudinal through bolt extending generally parallel to said longitudinal plane through said body for connecting and disconnecting said left hand trolley line assembly to the base leg of said left hand yoke, and said right hand longitudinal through bolt extending generally parallel to said longitudinal plane through said body for connecting and disconnecting said right hand trolley line assembly to the base leg of said right hand yoke.

6. An insulator switch as set forth in claim 5, said switch comprising
at least said left and right hand feeder cable assemblies and said switch assembly, said switch assembly being connected to the legs of said left and right hand yokes on one side of said body, and said feeder cable assemblies being connected to the legs of said left hand yokes on the opposite side of said body, said switch assembly thereby being separated by said non-conductive body from feeder cable when feeder cable is connected to said switch.

7. An insulator switch as set forth in claim 6, said switch also comprising said left hand and right hand feeder cable assemblies.

8. An insulator switch as set forth in claim 5, said switch comprising at least said switch assembly, said switch assembly comprising
a left hand blade plate mounting bracket and a right hand blade mounting bracket, said blade mounting brackets being connected to the respective first legs of said left hand yoke and said right hand yoke, said left and right hand blade plate mounting brackets being fixed to said legs of said left and right hand yokes by the same lateral through bolts that connect said yokes to said switch's base,
at least one blade contact plate connected to each of said left and right hand blade plate mounting brackets, said blade contact plates extending outwardly from said one side of said body in a plane generally parallel to said body's lateral phantom plane, and
a switch blade pivotally connected to one of said left hand and right hand blade contact plates, said pivot connecting being adjacent the top end thereof, said switch blade being movable into and out of electrical contact with the other of said left hand and right hand blade contact plates to which said switch blade is not connected.

9. An insulator switch as set forth in claim 8, said switch assembly comprising
structure defining a pivot bore adjacent the top end of both of said left and right hand blade contact plates, said switch blade being pivotally connectable to either of said blade contact plates to provide left to right switch action or right to left switch action as desired by the user.

10. An insulator switch as set forth in claim 8, said switch assembly comprising
removable bolts that connect said left and right hand blade contact plates to the respective ones of said left and right hand blade plate mounting brackets, removal of said removable bolts permitting said blade contact plates and said switch blade to be removed from assembled relation with said section insulator switch without removing said blade plate mounting brackets from assembly with said body.

11. An insulator switch as set forth in claim 10, said switch assembly comprising a handle pivotally connected to said switch blade between said switch blade's pivot connection with that blade contact plate to which it is pivotally connected and the free end of said switch blade, and a tension spring pivotally connected at one end to said handle intermediate the ends thereof, and at the other end to said switch blade.

12. An insulator switch as set forth in claim 10, said switch assembly comprising a lock-out strap connected to that one of said blade contact plates to which said handle is pivotally connected, said lock-out strap defining a lock-out bore positioned to receive a lock's hasp therethrough when said handle is in the full open position, said handle not being closable into contact with that other blade contact plate to which said handle is not pivotally connected when a lock's hasp is received through said lock-out bore.

* * * * *

UNITED STATES PATENT AND TRADEMARK OFFICE
CERTIFICATE OF CORRECTION

PATENT NO. : 4,365,129
DATED     : December 21, 1982
INVENTOR(S) : K. K. McKee

It is certified that error appears in the above—identified patent and that said Letters Patent is hereby corrected as shown below:

At column 6, line 15, "60a" should be --60b--.

At column 9, line 15, delete "(".

At column 9, line 17, "41z" should be --41a--.

At column 9, line 28, "parrallel" should be --parallel--.

At column 12, line 50, "connecting" should be --connection--.

Signed and Sealed this

Twenty-sixth Day of April 1983

[SEAL]

Attest:

GERALD J. MOSSINGHOFF

Attesting Officer

Commissioner of Patents and Trademarks